March 26, 1929.  A. MAGUIN  1,707,090
BEET SLICER OF THE DRUM TYPE

Filed Dec. 9, 1927    3 Sheets-Sheet 1

Inventor:
A. Maguin

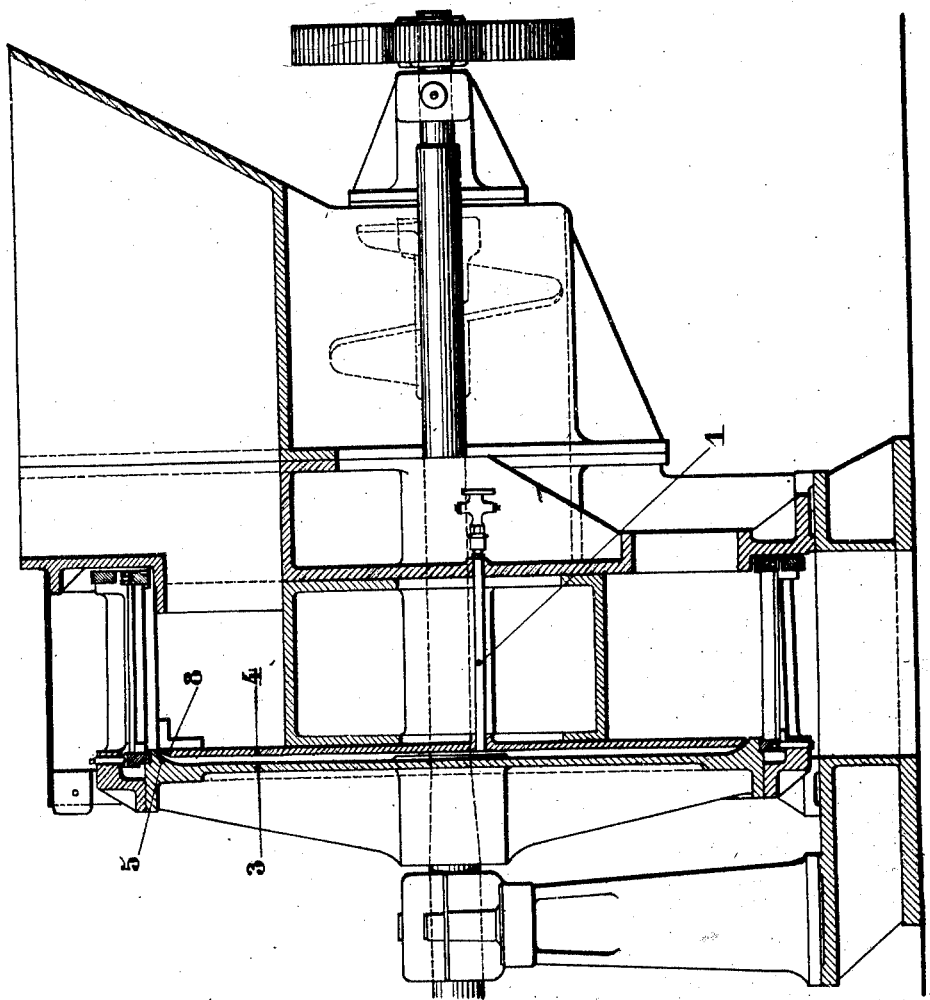

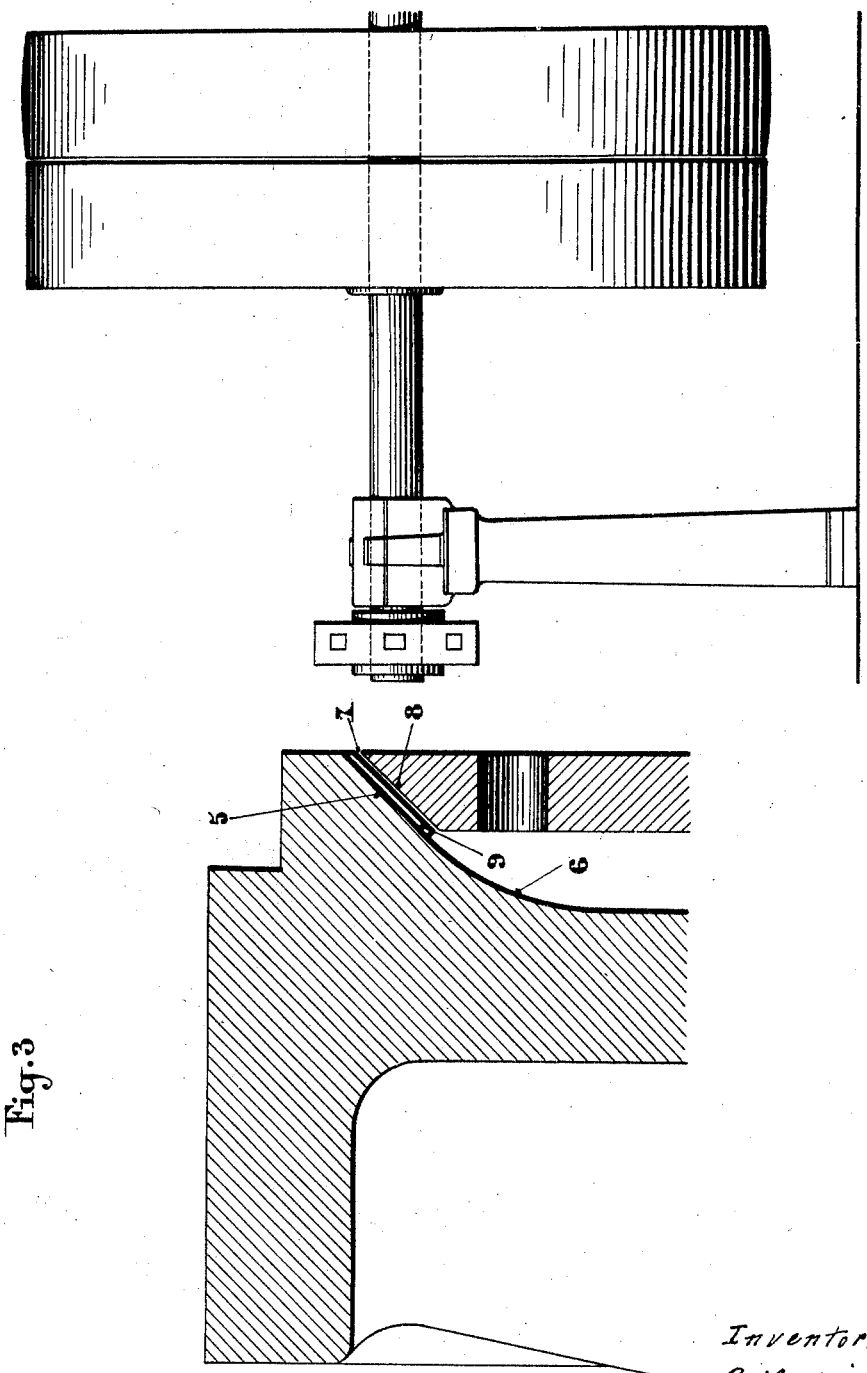

Patented Mar. 26, 1929.

1,707,090

UNITED STATES PATENT OFFICE.

ABEL MAGUIN, OF PARIS, FRANCE, ASSIGNOR TO SOCIETE NOUVELLE DES ETABLISSEMENTS ALFRED MAGUIN, OF CHARMES, NEAR LA FERE, AISNE, FRANCE, A CORPORATION OF FRANCE.

BEET SLICER OF THE DRUM TYPE.

Application filed December 9, 1927, Serial No. 238,933, and in France December 14, 1926.

This invention has for its object improvements to beet slicers of the drum type, which improvements allow to improve their operation and to reduce the motive power absorbed by these machines. The main features of the invention are that the stationary disc and the revolving drum are provided at their edge with a conical portion, that the moving part is furthermore provided with scrapers and that the apparatus comprises a device allowing the injection of water or steam during the operation.

On the annexed drawing a particular embodiment of the invention is shown schematically and only for illustration.

Fig. 2 is a section along II—II of Fig. 1.

Fig. 3 shows in detail at enlarged scale the position of a scraper.

Figure 1:
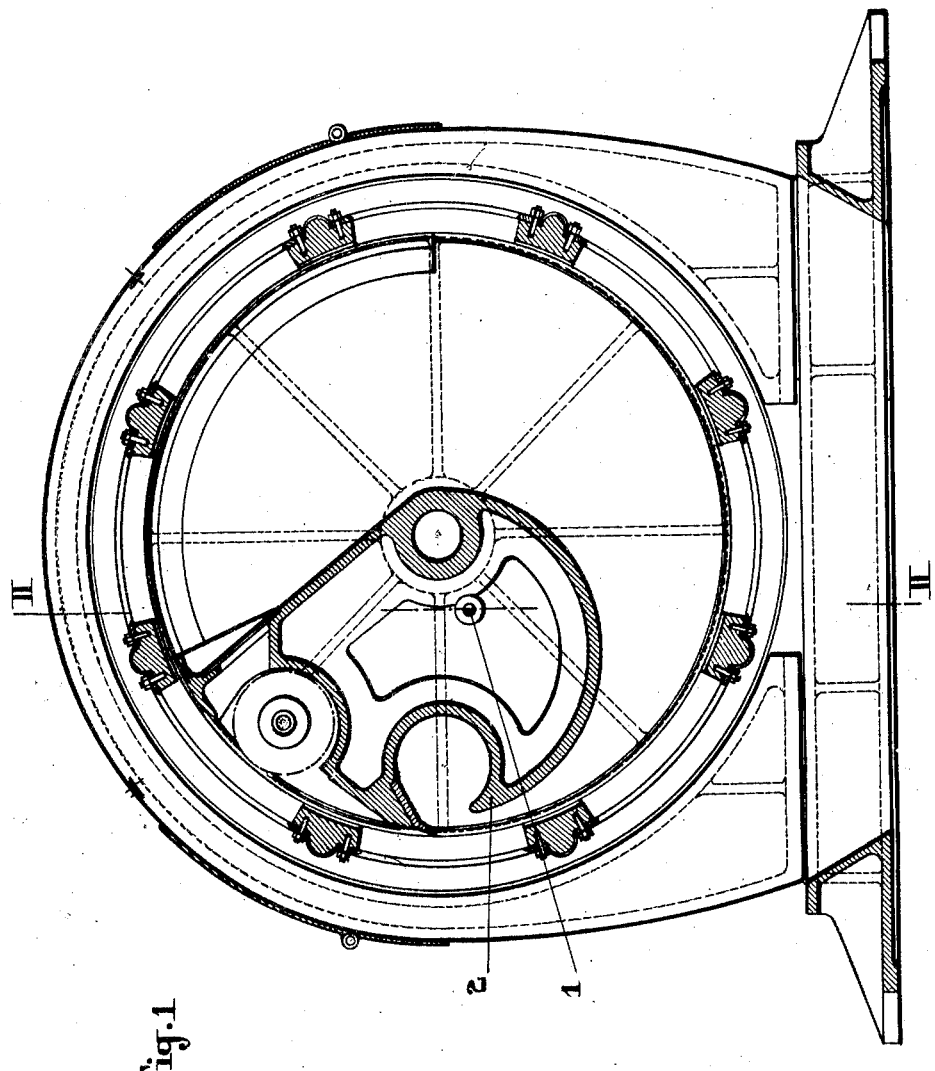
Fig. 1 is a cross section of a beet slicer of the drum type provided with the improvements which are the object of this invention.

According to the invention, water (or steam) is directed under pressure, by means of a pipe 1 passing through the "comma" shaped portion 2 of the beet slicer, as close as possible to the center of the apparatus, between the revolving drum 3 and the stationary disc 4. The slices contained in this space are diluted and the mixture of slices and water receives from the drum a rotating movement which is sufficient to throw it, under the action of the centrifugal force, toward the periphery of said drum. At its periphery the drum shows an internal conical border which is connected to the straight portion by means of a suitable curve 6 which causes the slices to be thrown toward the interior of the beet slicer and which prevents said slices of entering in the annular space 7 left between the drum and the surface of the stationary disc, where they might agglomerate to form a block on account of the sweet juice they contain. This would produce a considerable rubbing on the whole surface of the drum, which would cause an increase of the power requirements, a rapid wear on the drum and on the disc and a great axial thrust on the thrust bearing of the beet slicer. The stationary disc is also provided with a conical border 8 which corresponds to the conical portion 5 of the drum.

In order to complete this cleansing, scrapers 9 are attached to the internal border 5 of the drum, said scrapers 9 being suitably disposed according to the direction and the speed of rotation of this member. The greater part of the slices is thus thrown steadily toward the interior of the beet slicer whether it tends to penetrate in the annular space 7 or to leave this space mixed with the injection water.

This water or steam injecting device should be used three or four times daily while the factory is running.

The invention is not limited to the beet slicer shown on the drawing which is given only for illustration, but it can also be applied to any beet slicer of the drum type in which above mentioned results are contemplated.

I claim:

1. A beet slicer of the drum type comprising in combination a rotating drum with an internal conical border and a stationary disc with a portion of corresponding conical shape.

2. A beet slicer of the drum type comprising in combination a rotating drum with an internal conical border provided with suitably disposed scrapers and a stationary disc with portion of a conical shape corresponding to said conical border.

3. A beet slicer of the drum type comprising in combination a rotating drum with an internal conical border provided with suitably disposed scrapers, a stationary disc with a portion of a conical shape corresponding to said conical border and a fluid injecting device adapted to work during the operation of said beet slicer.

In testimony whereof I have signed my name to this specification.

ABEL MAGUIN.